US010083554B2

(12) United States Patent
Mattern

(10) Patent No.: US 10,083,554 B2
(45) Date of Patent: Sep. 25, 2018

(54) METHOD FOR CONTROLLING A GATE USING AN AUTOMATED INSTALLATION ENTRANCE (AIE) SYSTEM

(71) Applicant: Jeremy Keith Mattern, Houston, TX (US)

(72) Inventor: Jeremy Keith Mattern, Houston, TX (US)

(73) Assignee: Jeremy Keith Mattern, Houston, TX (US)

( * ) Notice: Subject to any disclaimer, the term of this patent is extended or adjusted under 35 U.S.C. 154(b) by 0 days.

(21) Appl. No.: 13/621,742

(22) Filed: Sep. 17, 2012

(65) Prior Publication Data

US 2014/0077927 A1 Mar. 20, 2014

(51) Int. Cl.

| | |
|---|---|
| ***H04Q 1/00*** | (2006.01) |
| ***H04Q 5/22*** | (2006.01) |
| ***E05F 15/00*** | (2015.01) |
| ***G06K 9/00*** | (2006.01) |
| ***G05B 19/00*** | (2006.01) |
| ***H04L 9/32*** | (2006.01) |
| ***G07C 9/00*** | (2006.01) |

(52) U.S. Cl.
CPC ................................ *G07C 9/00087* (2013.01)

(58) Field of Classification Search
CPC .. H04Q 1/00; H04Q 5/22; E05F 15/00; G06K 9/00; G05B 19/00; H04L 9/32
USPC .... 340/5.7, 10.1, 5.6, 938, 825.31; 160/188; 235/382; 49/49; 382/100, 115; 704/273
See application file for complete search history.

(56) References Cited

U.S. PATENT DOCUMENTS

| | | | | |
|---|---|---|---|---|
| 5,903,225 | A * | 5/1999 | Schmitt et al. | 340/5.25 |
| 6,611,195 | B1 * | 8/2003 | Manneschi et al. | 340/5.52 |
| 6,919,823 | B1 * | 7/2005 | Lock | G08G 1/0175 340/916 |
| 6,945,303 | B2 * | 9/2005 | Weik, III | 160/188 |
| 7,076,083 | B2 * | 7/2006 | Blazey | 382/100 |
| 7,421,097 | B2 * | 9/2008 | Hamza et al. | 382/118 |
| 7,817,013 | B2 * | 10/2010 | Bazakos et al. | 340/5.7 |
| 7,898,385 | B2 * | 3/2011 | Kocher | 340/5.52 |
| 7,969,280 | B2 * | 6/2011 | Slevin | 340/5.31 |
| 7,986,248 | B2 * | 7/2011 | Lock | G08G 1/0175 340/916 |
| 8,175,591 | B2 * | 5/2012 | Fitzgibbon | 455/420 |
| 8,254,631 | B2 * | 8/2012 | Bongard | 382/103 |
| 8,319,606 | B2 * | 11/2012 | McGeachie | 340/5.81 |
| 8,542,096 | B2 * | 9/2013 | Pederson | G07C 9/00158 340/5.83 |
| 8,639,435 | B2 * | 1/2014 | Fliegen | G08G 1/054 340/905 |
| 8,665,062 | B2 * | 3/2014 | Bragagnini et al. | 340/5.52 |
| 2012/0188054 | A1 * | 7/2012 | Bongard | 340/5.61 |

* cited by examiner

*Primary Examiner* — Nam V Nguyen
(74) *Attorney, Agent, or Firm* — Jonathan M. Pierce; Porter Hedges LLP

(57) ABSTRACT

A method for controlling a gate using an AIE system is disclosed herein. The method can comprise receiving identification data from an identification card using an identification card reader mounted to a first surface of an enclosure and receiving biometric data from a biometric data reader mounted to a first surface of an enclosure. The method can further comprise searching for a profile within a memory that comprises an identification data and biometric data, as well as wirelessly sending an instruction to open a gate, if the profile is authorized.

14 Claims, 8 Drawing Sheets

METHOD FOR CONTROLLING A GATE USING AN AUTOMATED INSTALLATION ENTRANCE (AIE) SYSTEM

BACKGROUND

This disclosure relates to a method for controlling a gate using an Automated Installation Entrance (AIE) system.

Various methods have been implemented to provide pass control transactions for authorized entrants to enter a secured facility. Most often, manual checks, body searches, or vehicle inspections are made to ensure that any individual entering a secured area does not pose a threat and would not cause violence within the premise. However, a manual check for every individual entering a facility can be time-consuming, inefficient, and inconvenient, as military installations can receive hundreds to thousands of visitors and vehicles daily. Moreover, identity information or an ID alone may not be a sufficient way of checking the credibility of an individual.

To complement identification checks, installations have added cameras, gate controls, biometric readers, and vehicle detection systems, independently or connected, over wired networks. One problem with such systems, however, is the complexity in installing such systems. Often, each device is a separate system that requires a unique installation into a present existing system. Furthermore, installation can sometimes require structural modifications to an area that can be time consuming and expensive. Such examples can include running conduit and electrical lines under a road. To do so, requires a significant construction project that costs time and money and creates an inefficient use of space during the construction.

As such, it would be useful to have a method for controlling a gate using an AIE system.

SUMMARY

A method for controlling a gate using an Automated Installation Entrance (AIE) system is disclosed herein. The method can comprise receiving an identification data from an identification card using an identification card reader mounted to a first surface of an enclosure and receiving biometric data from a biometric data reader mounted to a first surface of an enclosure. The method can further comprise searching for a profile within a memory that comprises an identification data and biometric data, as well as wirelessly sending an instruction to open a gate, if the profile is validated.

Also, the system can comprise a computer readable storage medium having a computer readable program code embodied therein. The computer readable program code can be adapted to be executed to implement the above mentioned method.

DETAILED DESCRIPTION

Described herein is an AIE device. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1A:
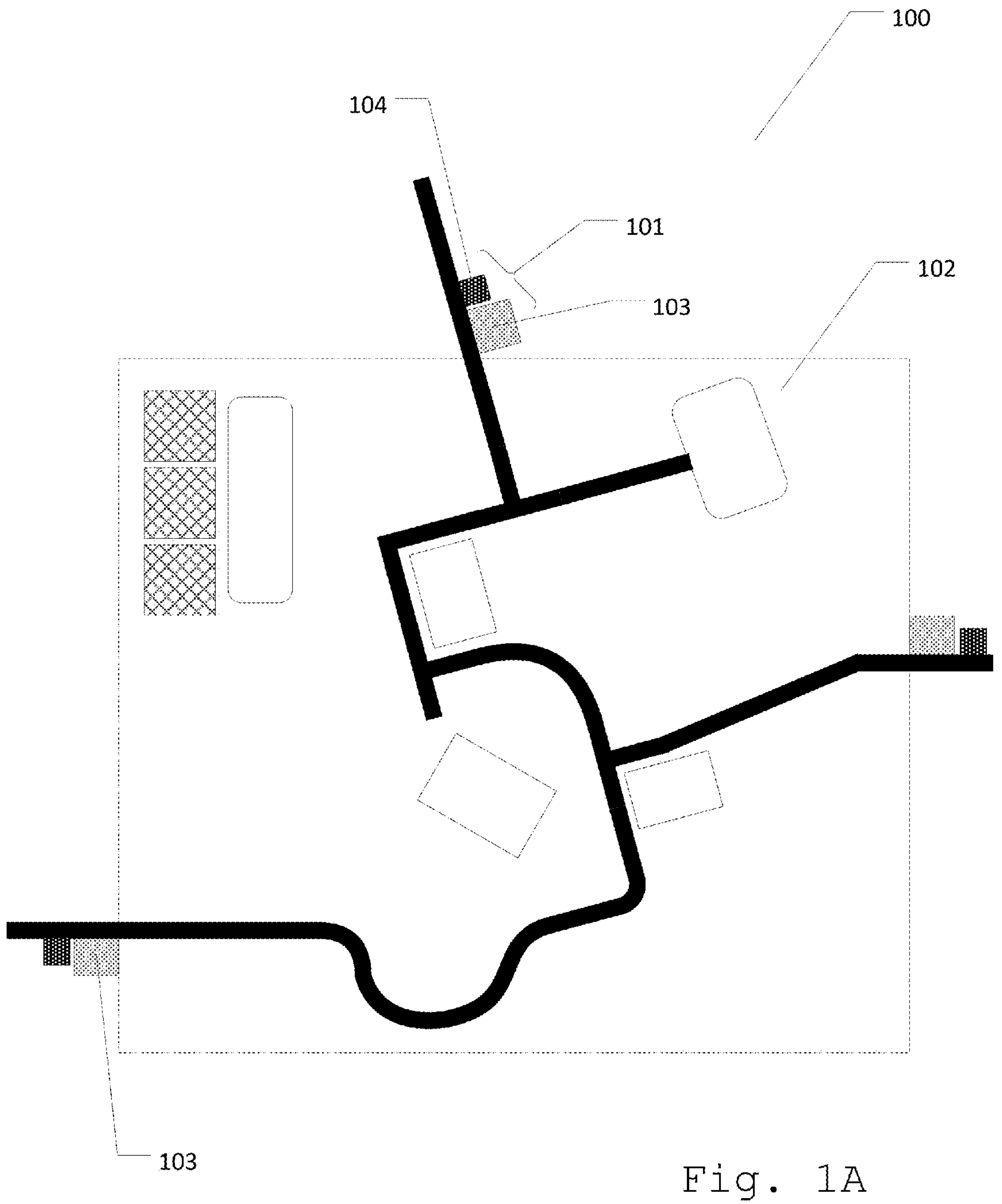
FIG. 1A illustrates an aerial view of a facility comprising multiple AIE devices.

FIG. 1A illustrates an aerial view of a facility 100 comprising multiple AIE devices 104. Facility 100 can comprise one or more checkpoints 101 strategically placed around secured area 102. Facility 100 can refer to any public or private installations designed to restrict unauthorized individuals from accessing, such as a military base, and/or a military installation. Secured area 102 can be the area within the border of facility 100. Secured area 102 can be the area protected and restricted by checkpoints 101. Checkpoints 101 can be a structure or an area within facility 100 that functions as an entry point into secured area 102.

Facility 100 can comprise gates 103 at various checkpoints 101. Gates 103 can be structures that can open up and block off access to entry points. Gates 103 can include, but are not limited to, movable doors, fences, posts, and/or rails, which can obstruct an access point when closed. Gates 103 can be structures that can open up and block off entryways at checkpoints 101. Gates 103 can include, but are not limited to, movable doors, fences, posts, and/or rails, which can obstruct an access point when closed. In one embodiment, gates 103 can be made accessible by electronic means. Furthermore, gates 103 can be accompanied by a guard shack, which can house and assist personnel with security operations at checkpoints 101.

Figure 1B:
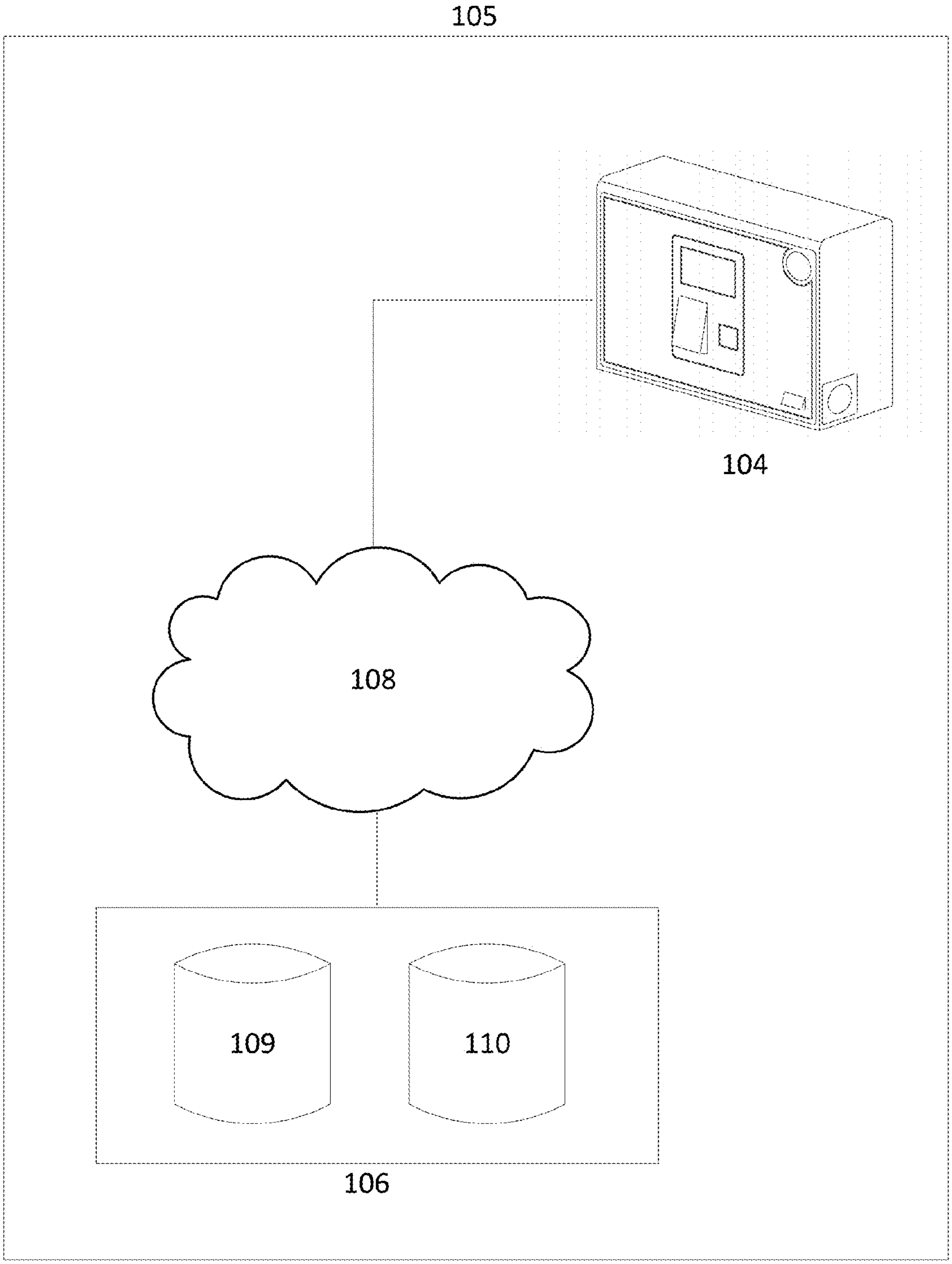
FIG. 1B illustrates a pass control system.

FIG. 1B illustrates a pass control system 105. Pass control system 105 can comprise a plurality of AIE devices 104, and a memory 106, connected via a network 108. Memory 106 can be capable of storing files and data information. Memory 106 can comprise biometric enrollment data 109 and identification data 110, which can both comprise identifying information provided by a person or entrant at some point prior to gaining access to facility 100. Memory 106 can be accessible by AIE device 104 over a network, or memory 106 can be local to AIE device 104. In one embodiment, memory 106 can be a component of AIE device 104. In one embodiment, AIE device 104 communicates with memory 106 through another server on pass control system 105. In such embodiment, memory 105 can be memory associated with the server, or can be a database directly accessible by the server. In one embodiment, memory 106 or some other memory in AIE device can be programmed to perform the steps in this disclosure.

Biometric enrollment data 109 and identification data 110 can be associated with a profile for a particular entrant. Identification data 110 can include, but is not limited to, name, entrant's name, military rank, serial number, grade, military organization, military installation, address, and/or date of birth. Biometric enrollment data 109 can include physical data, such as fingerprint data from one or more fingers, or retina scan data from one or both eyes. Biometric enrollment data 109 and identification data 110 in memory 106 can be recorded, organized, and shared over network 108. Network 108 can be a wide area network (WAN), or a combination of local area network (LAN), and/or piconets. Network 108 can be hard-wired, wireless, or a combination of both. A LAN can be a network within a single organization while WAN can be the Internet.

Biometric data and identification data can be provided by an entrant by directly inputting into AIE device 104. AIE device 104 can compare currently inputted biometric data and identification data with previously submitted biometric enrollment data 109 and identification data 110 stored in an AIE memory 106. Upon confirming a match, AIE device 104 can perform an action. In one embodiment, AIE device 104 can store and send out data information through network 108. AIE device 104 can be placed at each checkpoint 101, which can be accessible to authorized security personnel stationed at checkpoint 101. Memory 106 can be one or more devices capable of storing data information accessible through network 108.

Figure 2:
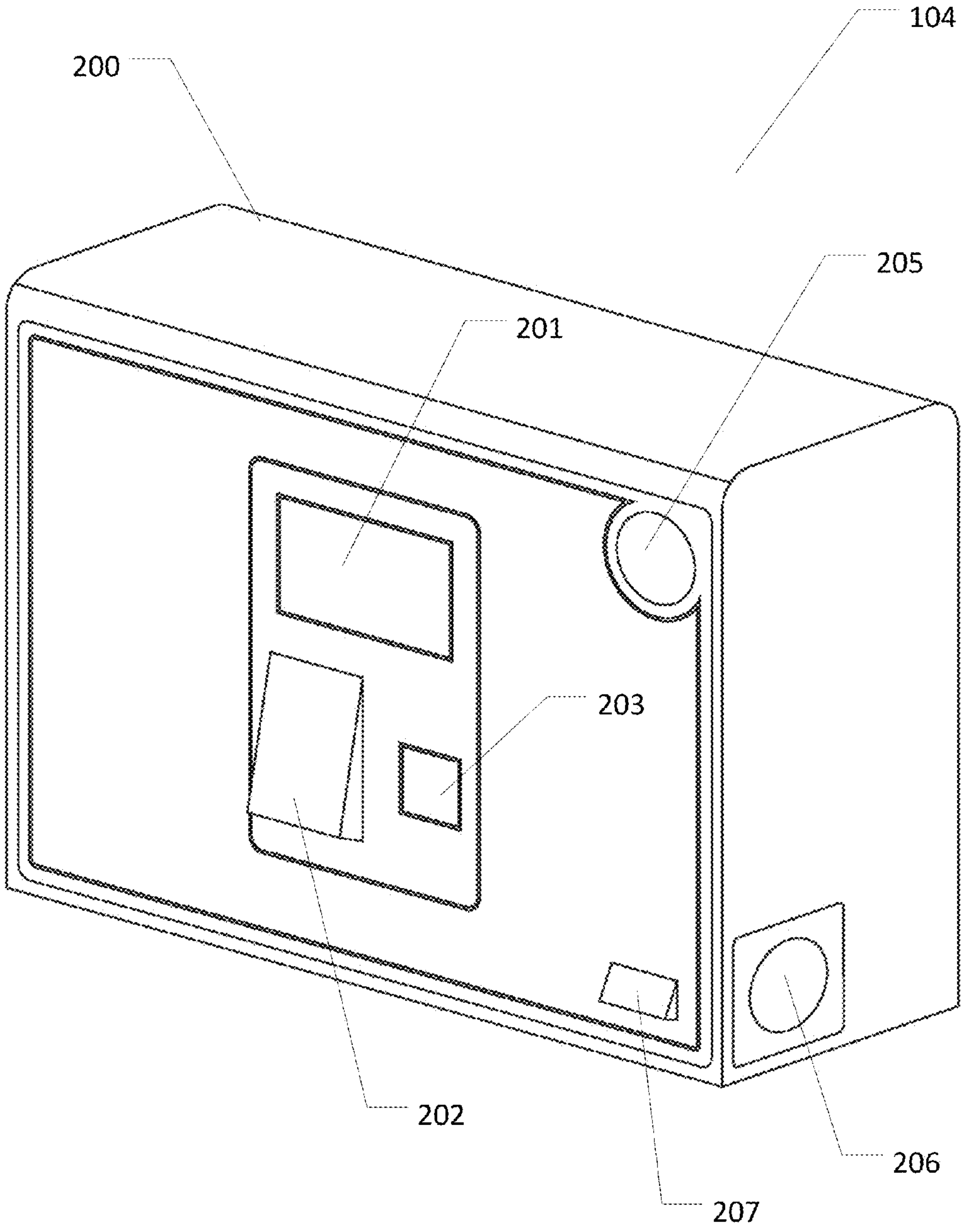
FIG. 2 illustrates a first surface view of an AIE device.

FIG. 2 illustrates a first surface view of an AIE device 104. AIE device 104 can comprise an enclosure 200 having a plurality of surfaces. AIE device 104 can comprise a screen 201 within a first surface. In one embodiment, screen 201 can be a mere display output. Screen 201 can display a variety of information, including but not limited to, granting or denial of access, entrant's biometric data or identification data 110, a scanning status, an acceptance or granting of scan, and/or other directions for guard or entrant. In another embodiment, screen 201 can also be a touch screen, allowing for input of data. In an embodiment where screen 201 is a touch screen, a keypad can be represented virtually on screen 201.

AIE device 104 can further comprise one or more identification determining devices, which can comprise, in one embodiment, a card reader 202 and a fingerprint scanner 203. Fingerprint scanner 203 can comprise a touch surface, upon which an entrant or user can place fingers to give fingerprint data. Fingerprint scanner 203 can be any scanner known in the art now or in the future. In one example, fingerprint scanner 203 can use optical imaging, which uses light, and/or capacitance, which uses an electrical current, to capture minutiae and/or images from ridges of fingers pressed upon the touch surface. Fingerprint scanner 203 can produce a digital image from the scan. In one embodiment, fingerprint scanner 203 can utilize sound waves to capture an image sample of fingerprints. After a sample results, AIE device 104 can compare minutiae of the sample with fingerprints from previously enrolled biometric data.

AIE device 104 can comprise further a first camera 205 within enclosure 200. First camera 205 can be protected by a clear shield comprising plastic, glass or another transparent solid material. First camera 205 can be strategically positioned to capture an identifying view of entrant. First camera 205 can create digital representations of images to be stored in memory 106 or some other memory. First camera 205 can have enhancement features, such as lights or night vision, for example, to ascertain profile of user or entrant at all hours.

In addition, AIE device 104 can comprise a second camera 206. Second camera 206 can be encased in a clear shield comprising plastic, glass or another transparent solid material. First camera 205 can be strategically positioned, either on a first surface (front) or side surface, to optimally capture an identifying view of a vehicle license plate. Similarly, second camera 206 can be digital and capable of producing and storing media files. Second camera 206 can have enhancement features, such as lights or night vision, for example, to ascertain profile of user or entrant at all hours. Second camera 206 can send media files to pass control system 105.

Furthermore, AIE device 104 can comprise a sensor 207. Sensor 207 can be positioned strategically on AIE device 104 to optimize the detection of vehicles and entrants. In one embodiment, sensor 207 can be activated merely when the vehicle enters a predetermined proximity of sensor 207. In another embodiment, sensor 207 can also comprise motion detecting, in which the movement of vehicles into a preset detection zone can activate presence of vehicle.

Figure 3:
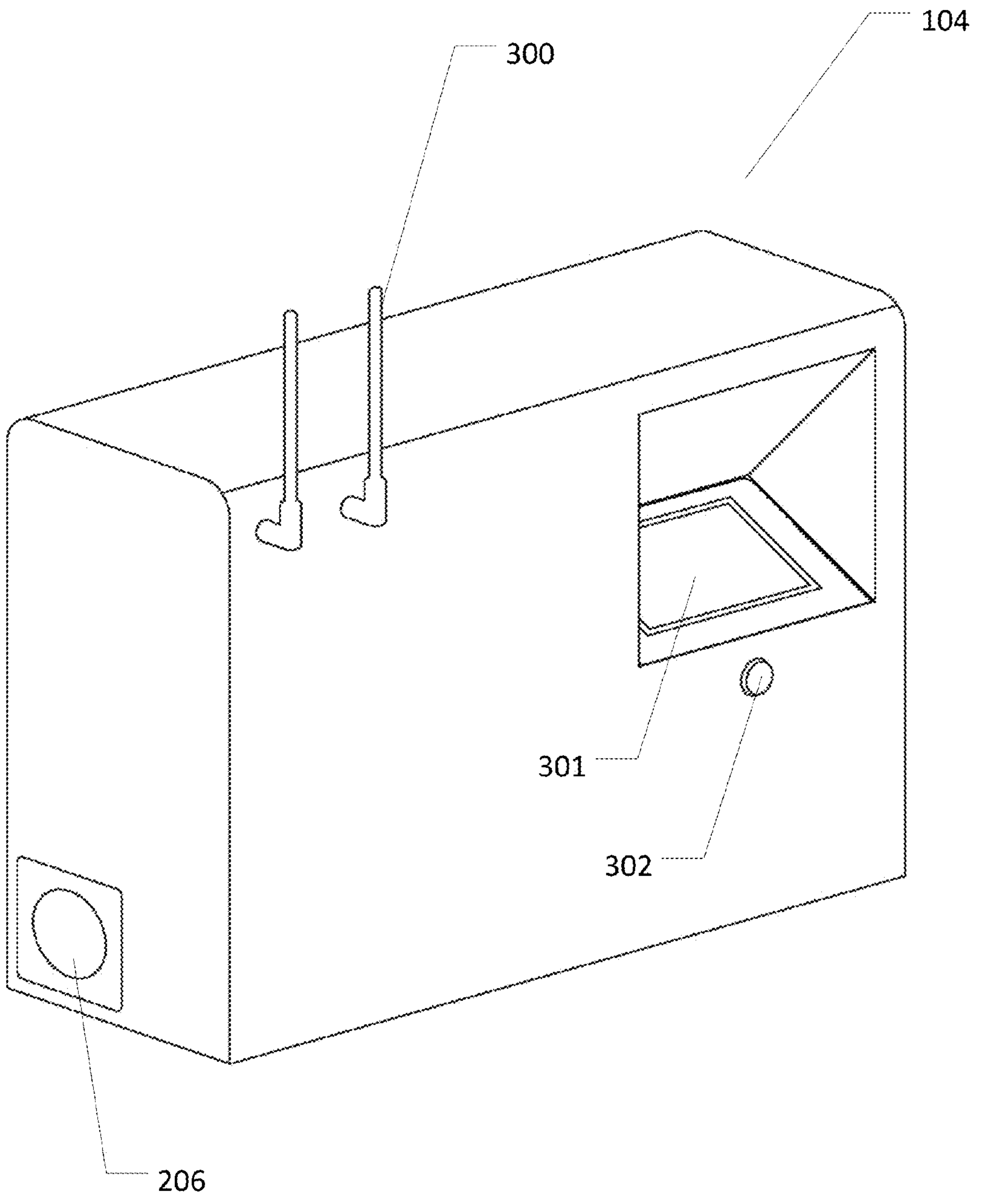
FIG. 3 illustrates a second surface view of an AIE device.

FIG. 3 illustrates a second surface view of an AIE device 104. As entrants enroll or utilize first surface of AIE device 104, military personnel can operate features on second surface of AIE device 104. In a preferred embodiment, second surface is on a side of AIE device 104 opposite of first surface. AIE device 104 can comprise an antenna link 300. Antenna link 300 can be connected to AIE device 104 and a transceiver capable of communication by sending and receiving radio signals. In one embodiment, antenna link 300 can interact directly with gate 103, which can also comprise a wireless receiver and/or transceiver. In one embodiment, antenna link 300 can communicate with gate 103 via short range wireless communications. In another embodiment, antenna link 300 can interact via wireless communication with pass control system 105 and/or gate 103.

AIE device 104 can also comprise a second screen 301 mounted within second surface. Second screen 301 can display output. Second screen 301 can display a variety of information, such as, but not limited to granting or denial of access, entrant's biometric data or identification data, a scanning status, an acceptance or granting of scan, and/or other directions for guard or entrant. In one embodiment, second screen 301 can also be a touch screen, allowing for input of data.

AIE device 104 can also comprise an indicator 302 mounted within second surface. Indicator 302 can comprise a light or other overt signal observable by authorized personnel, such as a sound. In one embodiment, screen 301 can function as indicator 302.

In one embodiment, entrants can be excluded entirely from viewing second surface side of AIE device 104 for security enhancement. To enhance security, second screen 301, in one embodiment, can be placed inside an indentation in structure of AIE device 104 to further prevent unauthorized personnel from viewing second screen 301.

Figure 4:
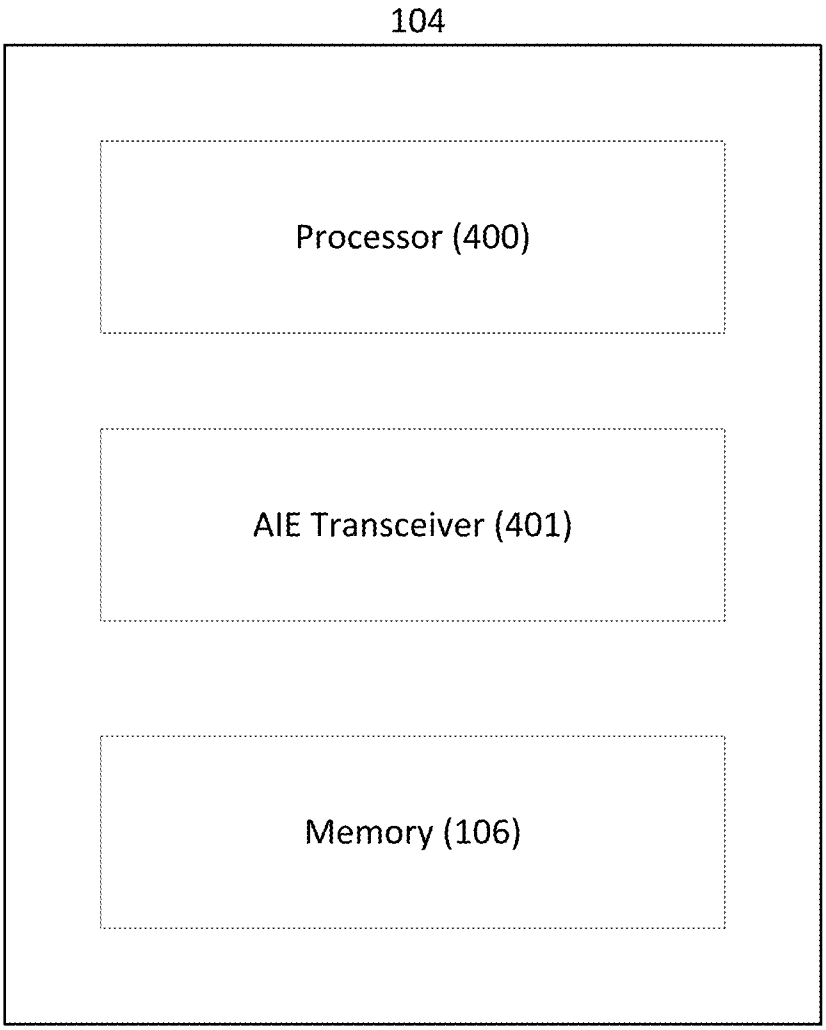
FIG. 4 illustrates an internal view an AIE device.

FIG. 4 illustrates an internal view of an AIE device 104. AIE device 104 can comprise an AIE processor 400, an AIE transceiver 401, and, in one embodiment, all or a portion of memory 106. AIE processor 400 can perform processes on the data according to an application stored in a memory 106. Processes can include storing biometric enrollment data 109 to memory 106, verifying that biometric data conforms to preset standards, matching comparisons of input biometric data with biometric enrollment data has been gathered for information inquiry to be complete. Furthermore, AIE processor 400 can send commands for AIE transceiver 401 to send signals, as well as process signals received from AIE transceiver 401.

AIE transceiver 401 can send and receive radio signals via radio waves to and from pass control system 105. In another embodiment, transceiver 401 could be a wired network card. As AIE device 104 receives an entrant's biometric data, for example, AIE transceiver 401 can send biometric data to AIE transceiver 401 to compare with stored biometric enrollment data 109 in said memory 106. AIE transceiver 401 can then also receive results from pass control system 105 and/or memory 106 when memory 106 is accessible over network 108. Furthermore, AIE transceiver 401 can also interact with a transceiver or receiver attached to gate 103.

Figure 5:
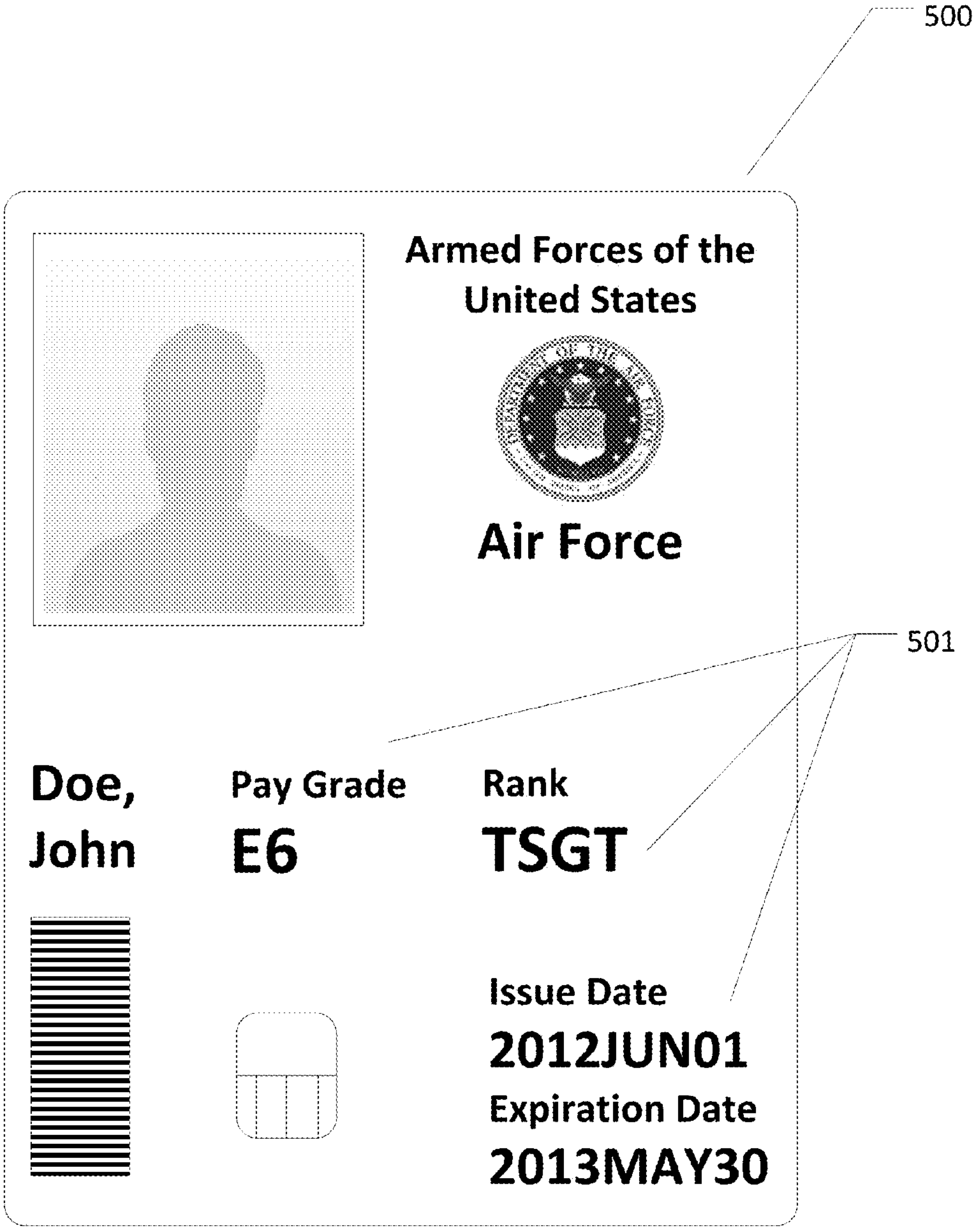
FIG. 5 illustrates a front view of an identification card.

FIG. 5 illustrates a front view of an exemplary identification card 500 comprising identification information 110. Information on identification card 500 can be identification information 110, and can comprise an identification number, name, address, birthday, rank, serial number, driver license number, social security number, and/or any other information encoded on identification card 500 whether written, magnetically encoded, radio-frequency identification (RFID) encoded, barcoded, smart card, or encoded by some other method in the art. Identification card 500 can be military issued, such as a common access card ("CAC card"), or civilian issued card, such as a driver's license. In one embodiment, biometric data can be included on identification card 500 and also readable by scanner 202.

Figure 6:
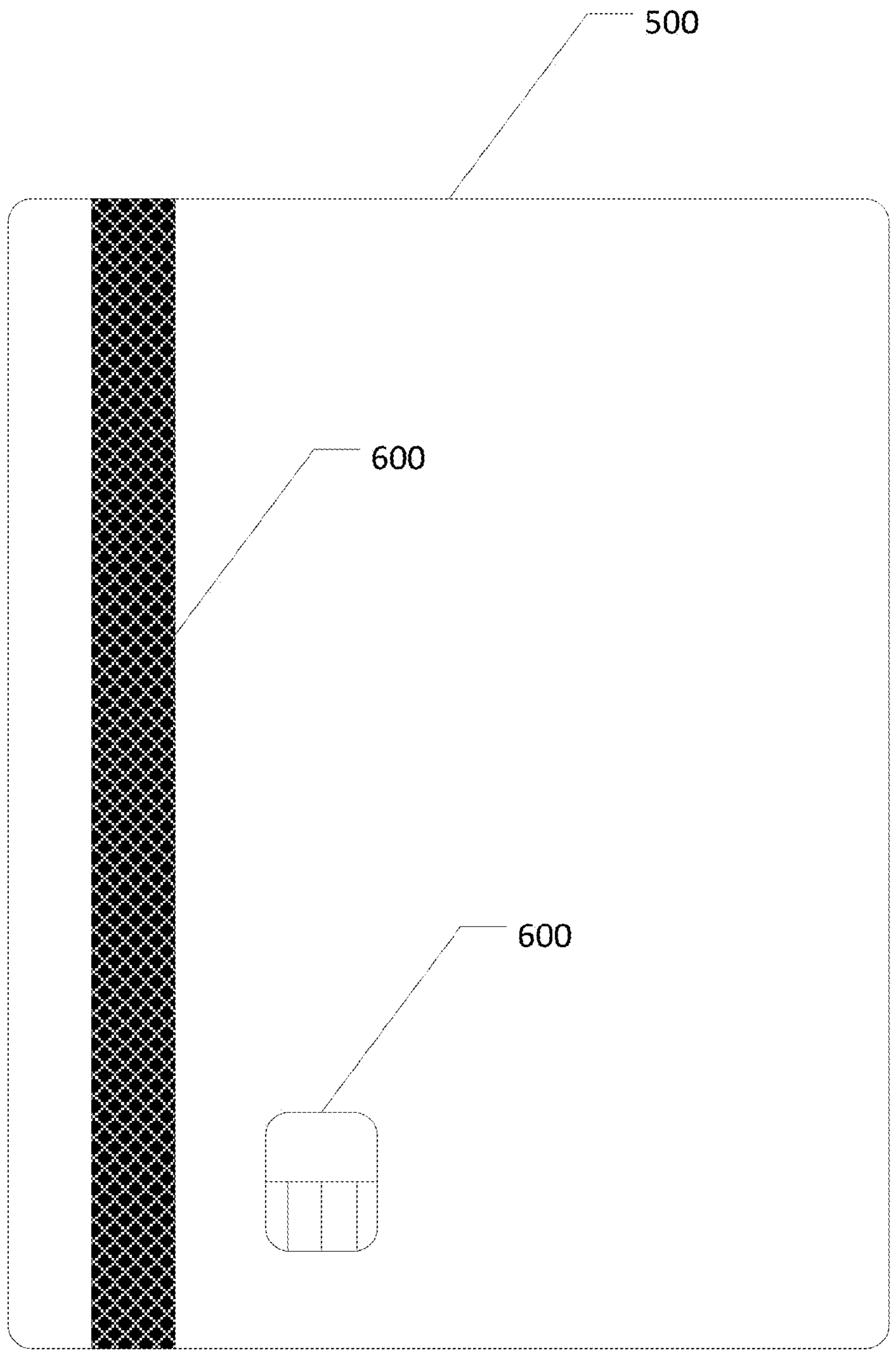
FIG. 6 illustrates a back view of an identification card comprising a machine-readable zone.

FIG. 6 illustrates a back view of an exemplary identification card 500 comprising a machine-readable zone 600. Card reader 202 can read machine-readable zone 600. Machine-readable zone 600 can be in any form, such as a magnetic strip, barcode, smart card, or RFID chip. The placement of items on the front or back of identification card 500 are only exemplary. In another embodiment, machine-readable zone 600 can be on the front of identification card 500.

Figure 7:
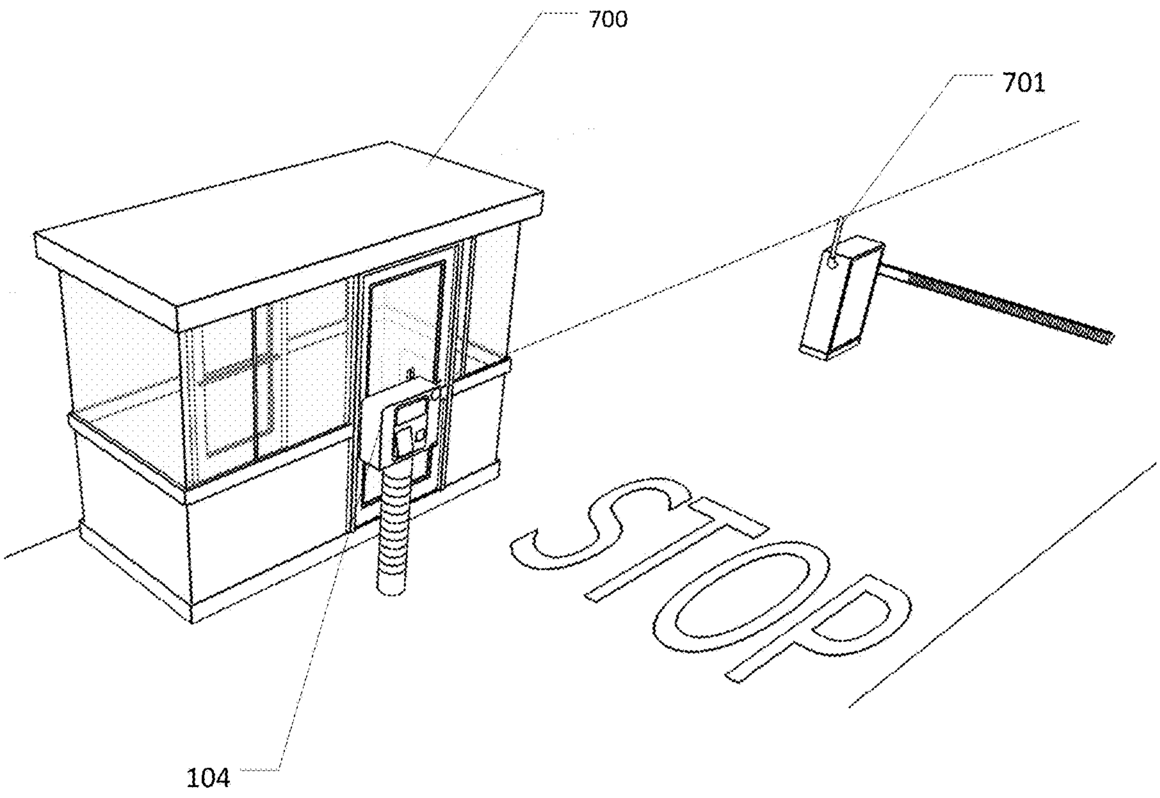
FIG. 7 illustrates an AIE device in front of a guard shack on a road with a mechanically actuated gate in front of it.

FIG. 7 illustrates an AIE device 104 in front of a guard shack 700 on a road with a gate 103 in front of it. In one embodiment, an entrant that is approaching checkpoint 101 for the first time can register with pass control system 105 using AIE device 104. In such embodiment, a guard that is present can, using second screen 301, put AIE device 104 in a registration mode. By doing so, AIE device 104 is capable of collecting identification data 110 and biometric enrollment data 109. During registration, card reader 203 can read identification data 110 from identification card 500 supplied by registering entrant. Additionally, biometric reader such as fingerprint scanner 203 can collect biometric enrollment data 109. Once collected, AIE device 104 can, with biometric enrollment data 109 and identity card data 110, create a new profile in memory 106 that is associated with the registering entrant. Once registered, entrant is capable of being granted access to facility 100 using pass control system 105. While AIE device 104 is in normal operating mode, which in a preferred embodiment is the default operating mode, an entrant can approach the device, offer an identification card 500 to card reader 202, and offer biometric data to the biometric reader. For example, the entrant can offer one or more fingerprints to fingerprint scanner. In one embodiment, the number of fingerprints necessary for entry can be dependent on a threat condition. AIE device 104 can transmit identity card information 501 collected by card scanner 202, as well as biometric data, to find a profile that contains both. If such profile can be found, then access to facility 100 can be granted if profile indicates that such entrant is authorized, or if profile contains no flags that would indicate they should not be authorized for entry. Such flag, in one embodiment, could relate to a previously performed background check. In one embodiment, if access is granted, AIE device 104 can open gate 103 automatically. In such embodiment, gate 103 can comprise an antenna 701, allowing it to open and close by radio wave communication. Further, in such embodiment, gate 103 can be opened and closed by short-range radio communication wave from AIE device 104. In another embodiment, gate 103 can connect to network 108 and can be opened by AIE device over wireless communication. In another embodiment, there can be an ad-hoc network between AIE device and gate 103 that allows AIE device 104 to control gate 103. In one embodiment, AIE device can comprise sensor 207. In such embodiment, sensor can determine when a vehicle or entrant is present. In such embodiment, AIE device 104 can also comprise first camera 205 an/or second camera 206. As sensor 207 senses entrant or car, within a predetermined period after, first camera 205 and/or second camera 206 can capture images or video. First camera 205 can capture entrant, while second camera 206 can capture a license plate.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method for controlling a gate using an automated installation entry (ATE) system comprising:
- receiving identification information identifying an entrant from an identification card associated with said entrant using an identification card reader mounted to a first surface of an enclosure;
- receiving biometric data from a biometric data reader mounted to the first surface of said enclosure;
- searching for a profile within a memory that comprises said identification information and said biometric data;
- granting access to a facility controlled by a gate, by wirelessly sending an instruction to open said gate, if said profile indicates that said entrant is authorized, wherein said authorization is based at least in part on a previously performed background check; and
- capturing an image of a license plate with a camera before entry, wherein granting access triggers capturing said image.

2. The method of claim 1, wherein wirelessly sending an instruction comprises sending said instruction over WIFI.

3. The method of claim 1, wherein wirelessly sending an instruction comprises sending said instruction over radio communications.

4. The method of claim 1, wherein said identification card is a civilian identification card.

5. The method of claim 1, wherein said identification card is a military identification card.

6. The method of claim 1, wherein said identification information comprises a name and a date of birth.

7. The method of claim 1, wherein said identification card reader reads a contactless smartcard on said identification card.

8. The method of claim 1, wherein said identification card reader reads a magnetic strip on said identification card.

9. The method of claim 1, wherein said biometric data comprises fingerprint data.

10. The method of claim 9, wherein said fingerprint data comprises two fingerprints.

11. The method of claim 9, wherein said fingerprint data comprises three fingerprints.

12. The method of claim 1, wherein said camera is a second camera, the method further comprising capturing an image of an entrant with a first camera before entry.

13. The method of claim 12, wherein said second camera is mounted within a second surface of said enclosure.

14. A non-transitory tangible computer readable storage medium having a computer readable program code embodied therein, wherein the computer readable program code is adapted to be executed to implement the method of claim 1.

* * * * *